Nov. 11, 1930.  J. L. STEVASON  1,780,950
PLANT PROTECTOR
Filed March 23, 1928
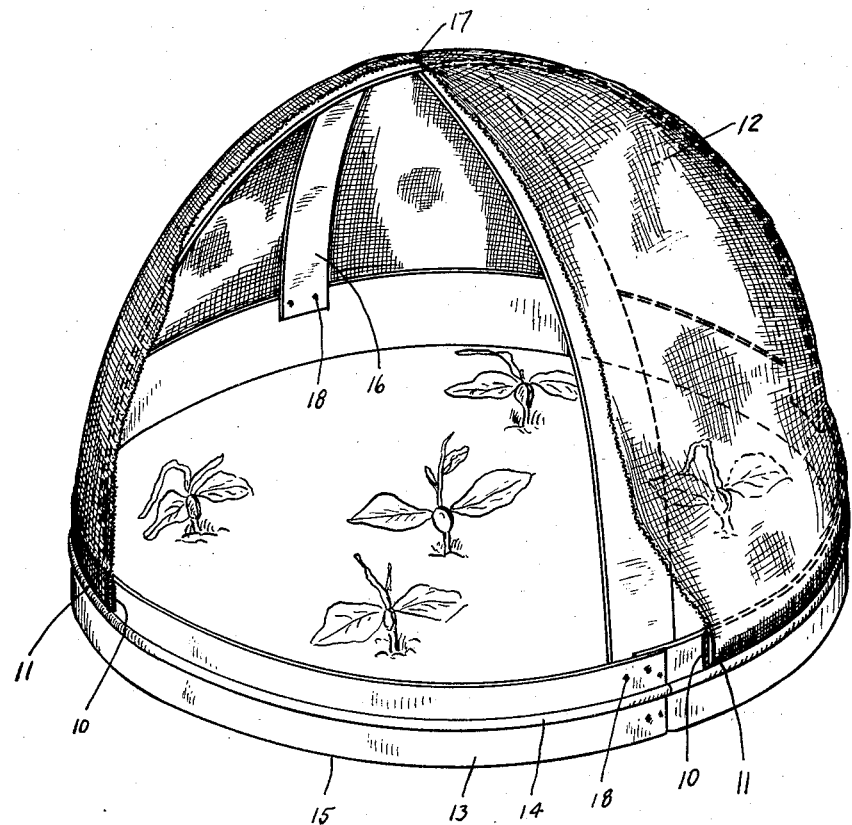
INVENTOR.
JOHN L. STEVASON.
BY
ATTORNEYS.

Patented Nov. 11, 1930

1,780,950

UNITED STATES PATENT OFFICE

JOHN L. STEVASON, OF INDIANAPOLIS, INDIANA

PLANT PROTECTOR

Application filed March 23, 1928. Serial No. 264,264.

This invention relates to a plant protector.

The chief object of the invention is to provide a plant protector which is not only efficient for the purpose set forth but which is so constructed that the same can be shipped or stored in knock-down relation and which is likewise so constructed that the least permanent part of the device can be readily replaced if and when required by the owner at a relatively low cost, and which permits the storage of the part most subject to deterioration in a relatively collapsed relation so that it can be protected.

The chief feature of the invention consists in the formation of the plant protector in two parts which are detachably associated together, one of which constitutes a sealing and supporting frame and the other of which constitutes a hood.

The full nature of the invention will be more clearly understood from the accompanying drawings and the following description and claim.

In the drawing, the figure is a perspective view with parts broken away to show the invention in detail and in position for use.

In the drawings the hood is shown comprising a metal band 10 or rim which supports a loop or end portion 11 of a fabric hood or cap portion 12 which is formed of sectored pieces of cloth, such as cheese cloth or similar material. Any other suitable form of fastening or connection may be provided. The hood or cap is approximately hemispherical in shape and has a circular rim outline although the invention is not necessarily limited to this outline.

The frame for supporting the hood comprises a similarly outlined rim or band 13 and formed intermediate the top and bottom is a bead 14 which serves as a stop for the hood member 10 when the same is wedgingly fitted thereon. The lower edge 15 of the rim member 13 is adapted to be forced into the ground and thus constitutes a penetrating or cutting edge and prevents access of surface crawling and air passing insects and the like, from gaining access to the earth immediately within the rim and the plant enveloped thereby. Spot welded or otherwise suitably secured to the interior of the rim as at 18 are a plurality of partial hoops or ribs 16 which herein are shown two in number and which cross and are spot welded together at 17. The ribs support the fabric in hemi-spherical or plant protecting position.

The device is so arranged that the frames can be telescoped one within the other and thus shipped in nested relation. The frames, if made of non-rustable material such as galvanized sheet metal, can be stored anywhere and will last practically indefinitely. The hood portion and the fabric of the hood when detached from the frame can be collapsed and several frames can be positioned one upon the other and placed within a metal box or similar container so that mice or the like cannot gain access thereto. When the rim of the frame has been driven into the ground in plant enveloping position or when the plant protector has been driven into the ground, having been previously assembled, said protector prevents insects from gaining access to the plant and also the fabric prevents the same and the flying insects from gaining access to the plant. Of course, the device is not a protection against insects which burrow. Particular utility of the device is for melon plants. It is estimated that an early hardy plant, particularly water melon, is worth about $2.50, while the cost of this device will not exceed 5% thereof as a retail price. It will be readily apparent that the device in addition to protecting the plant from insects will also protect the same from frost and will have the usual effect of hastening the growth of the plant which the usual hotbed has. If the fabric rots or is destroyed by field mice and the like, the same can be readily renewed by the operator of the melon field at a relatively low cost.

The invention claimed is:

A plant protector or the like, including a metal strap having a corrugation intermediate its side edges and arranged in rim formation with its lower side edge adapted for earth penetration, a hood including a dome like fabric portion, and a hood support including a fabric supporting rim and arms supported thereby and projecting upwardly for sustaining said hood in dome formation, said second mentioned rim having a similar outline and by which the mouth of the hood is secured and by which the second mentioned rim is detachably but rigidly and wedgingly supported by said first mentioned rim above the corrugation thereof when in plant enveloping and earth penetrating position to form a central clear dome like chamber within and beneath the hood.

In witness whereof, I have hereunto affixed my signature.

JOHN L. STEVASON.